US 10,940,566 B2

(12) United States Patent
Szuromi et al.

(10) Patent No.: US 10,940,566 B2
(45) Date of Patent: Mar. 9, 2021

(54) SURFACE IMPROVEMENT OF ADDITIVELY MANUFACTURED ARTICLES PRODUCED WITH ALUMINUM ALLOYS

(71) Applicant: HONEYWELL INTERNATIONAL INC., Morris Plains, NJ (US)

(72) Inventors: Andy Szuromi, Phoenix, AZ (US); Steve Starr, Scottsdale, AZ (US); Donald G. Godfrey, Phoenix, AZ (US); Mark C. Morris, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 380 days.

(21) Appl. No.: 16/059,620

(22) Filed: Aug. 9, 2018

(65) Prior Publication Data

US 2018/0345424 A1 Dec. 6, 2018

Related U.S. Application Data

(62) Division of application No. 14/933,154, filed on Nov. 5, 2015, now Pat. No. 10,105,798.

(51) Int. Cl.
*B23P 6/04* (2006.01)
*B22F 3/105* (2006.01)
(Continued)

(52) U.S. Cl.
CPC ............ *B23P 6/045* (2013.01); *B22F 3/105* (2013.01); *B22F 3/1055* (2013.01); *B22F 3/15* (2013.01);
(Continued)

(58) Field of Classification Search
CPC .... B22F 2003/247; B22F 3/1055; B22F 3/24; C23C 10/60; C23C 10/28; C23C 18/1689;
(Continued)

(56) References Cited

U.S. PATENT DOCUMENTS 2,654,701 A 10/1953 Calderon et al.
3,993,238 A 11/1976 Brook et al.
(Continued)

OTHER PUBLICATIONS

Sasscer D.S. et a; In-Situ Seawater Corrosion of Bare, Diffusion Zinc Treated and Alclad Aluminum Heat Exchanger Materials; 0197-7385/82/0000-0578, 1982 IEEE.
(Continued)

*Primary Examiner* — Nicholas A Wang
(74) *Attorney, Agent, or Firm* — Lorenz & Kopf, LLP

(57) ABSTRACT

A method for improving the surface of an aluminum alloy article includes manufacturing the aluminum alloy article using an additive manufacturing technique, wherein the article as-manufactured includes one or more of cracks, roughness, or porosity at a surface of the article; coating the surface of the aluminum alloy article with a diffusion element, the diffusion element being capable of diffusing at least 0.2 mils into the article; heating the aluminum alloy article coated with the diffusion element to cause the diffusion element to diffuse the at least 0.2 mils into the article, thereby forming a diffusion layer of at least 0.2 mils in thickness comprising both aluminum alloy and diffusion element; and removing the diffusion layer from the aluminum alloy article, whereby upon the removing, a resulting improved surface of the article comprises fewer or smaller cracks, reduced roughness, or reduced porosity.

20 Claims, 5 Drawing Sheets

(51) Int. Cl.
    *B22F 3/15*         (2006.01)
    *B22F 3/24*         (2006.01)
    *B22F 3/26*         (2006.01)
    *C23C 10/60*       (2006.01)
    *C22C 21/00*       (2006.01)
    *F01D 5/28*         (2006.01)
    *C23C 10/28*       (2006.01)
    *B23K 15/00*       (2006.01)
    *C23C 18/16*       (2006.01)
    *C23C 18/32*       (2006.01)
    *C23C 18/38*       (2006.01)
    *C23C 18/42*       (2006.01)
    *C25D 5/48*         (2006.01)
    *B22F 5/00*         (2006.01)
    *C22C 1/04*         (2006.01)
    *C23C 26/00*       (2006.01)
    *F01D 5/00*         (2006.01)
    *B33Y 10/00*       (2015.01)
    *B33Y 99/00*       (2015.01)
    *B22F 5/04*         (2006.01)

(52) U.S. Cl.
    CPC .................. *B22F 3/24* (2013.01); *B22F 3/26* (2013.01); *B23K 15/0086* (2013.01); *C22C 21/00* (2013.01); *C23C 10/28* (2013.01); *C23C 10/60* (2013.01); *C23C 18/1637* (2013.01); *C23C 18/1689* (2013.01); *C23C 18/32* (2013.01); *C23C 18/38* (2013.01); *C23C 18/42* (2013.01); *C25D 5/48* (2013.01); *F01D 5/288* (2013.01); *B22F 5/009* (2013.01); *B22F 5/04* (2013.01); *B22F 2003/247* (2013.01); *B22F 2998/10* (2013.01); *B33Y 10/00* (2014.12); *B33Y 99/00* (2014.12); *C22C 1/0416* (2013.01); *C23C 26/00* (2013.01); *F01D 5/00* (2013.01); *F05D 2230/22* (2013.01); *F05D 2230/90* (2013.01); *Y02P 10/25* (2015.11)

(58) Field of Classification Search
    CPC ......... C23C 18/32; C23C 18/38; C23C 18/42; B23K 15/0086; B33Y 10/00; B33Y 99/00; B29C 64/00
    USPC .............................................................. 419/3
    See application file for complete search history.

(56)                     References Cited

U.S. PATENT DOCUMENTS

| | | | |
|---|---|---|---|
| 8,506,836 B2* | 8/2013 | Szuromi | B22F 3/1055 216/102 |
| 2011/0311389 A1* | 12/2011 | Ryan | B22F 3/1055 419/27 |
| 2012/0222306 A1* | 9/2012 | Mittendorf | F01D 5/005 29/889.1 |
| 2013/0071562 A1 | 3/2013 | Szuromi et al. | |
| 2014/0079540 A1 | 3/2014 | Morris et al. | |
| 2014/0169971 A1 | 6/2014 | Vedula et al. | |
| 2014/0199175 A1 | 7/2014 | Godfrey et al. | |
| 2014/0205856 A1 | 7/2014 | Jiang et al. | |

OTHER PUBLICATIONS

Extended EP Search Report for Application No. 161953906-1373 dated Mar. 24, 2017.

* cited by examiner

AS BUILT

EXTERNAL SURFACE POLISHED

INTERNAL AS BUILT ROUGHNESS

EXTERNAL SURFACE POLISHED

INTERNAL AS BUILT ROUGHNESS

SUBSTANTIAL REDUCTION IN SURFACE ROUGHNESS IS POSSIBLE WITH POST-DMLS PROCESSING FOR EXTERNAL SURFACES: POLISH & ENCAPSULATE

SURFACE IMPROVEMENT OF ADDITIVELY MANUFACTURED ARTICLES PRODUCED WITH ALUMINUM ALLOYS

CROSS REFERENCE TO RELATED APPLICATIONS

This application is a divisional of U.S. patent application Ser. No. 14/933,154, filed on Nov. 5, 2015, the contents of which are herein incorporated by reference in their entirety.

TECHNICAL FIELD

The present disclosure generally relates to additive manufacturing technologies. More particularly, the present disclosure relates to surface improvement of additively manufactured articles produced with aluminum alloys.

BACKGROUND

Additive manufacturing (AM) processes, such as Direct Laser Metal Fusion (DMLF), have recently come to prominence as a cost-effective alternative to traditional manufacturing techniques. However, external and internal (e.g., hollow or cored) surfaces of articles formed by AM can exhibit surface roughness associated with the application of successive layers or the unintended clinging of powder particles to the free edges, as shown in FIG. 1. Internal defects and surface connected defects, like those shown in FIG. 2, may render a component unusable.

Prevention of this roughness condition may not be critical if the surface can be subsequently improved in a cost-effective manner. To the extent that such mechanical surface roughness is non-conforming with the engineering design intent or for cosmetic reasons, a means of smoothing the surface (or controlled excess stock removal) is desired, especially those surfaces which are inaccessible to hand-finishing or machine-finishing methods. Additionally, justification for required surface improvement, encapsulation, and subsequent hot isostatic press (HIP) processing extends to various metallurgical reasons including 1) smoothing undesirable surface roughness, 2) smoothing roughness to enable subsequent encapsulation of surface connected porosity and defects for HIP processing to eliminate internal and surface defects in the AM component, 3) removal of metallurgical surface defects such as micro cracking, and 4) being able to predicatively remove excess stock or non-conforming layers without creating metallurgical issues.

U.S. Pat. No. 8,506,836 discloses surface finish and encapsulation technologies for nickel-based alloys, but to date no such technology has ever been developed for aluminum alloys. For aluminum alloys, mechanical or electro-polish smoothing of external surfaces may reduce roughness, as shown in FIG. 3, but they may not enable surface connected defects to be eliminated in HIP processing. Thus, encapsulation is required to bridge the surface defects to enable successful HIP processing. U.S. Pat. Nos. 2,654,701 and 3,993,238 disclose zincate plating for aluminum, but they do not disclose diffusing the zinc into the substrate followed by subsequent stripping to enhance surface finish and enable successful encapsulation.

Accordingly, there remains a need in the art for surface improvement of additively manufactured articles produced with aluminum alloys. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to surface improvement of additively manufactured articles produced with aluminum alloys. In one exemplary embodiment, a method for improving the surface of an aluminum alloy article includes manufacturing the aluminum alloy article using an additive manufacturing technique, wherein the article as-manufactured includes one or more of cracks, roughness, or porosity at a surface of the article; coating the surface of the aluminum alloy article with a diffusion element, the diffusion element being capable of diffusing at least 0.2 mils into the article; heating the aluminum alloy article coated with the diffusion element to cause the diffusion element to diffuse the at least 0.2 mils into the article, thereby forming a diffusion layer of at least 0.2 mils in thickness comprising both aluminum alloy and diffusion element; and removing the diffusion layer from the aluminum alloy article, whereby upon the removing, a resulting improved surface of the article comprises fewer or smaller cracks, reduced roughness, or reduced porosity.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term "aluminum alloy" refers to any alloy wherein aluminum is the single greatest constituent thereof, as measured on a weight percentage basis. One example of this is the class of alloys where aluminum consists of a majority of the alloy, as measured on a weight percentage basis. To give some non-limiting examples of aluminum alloys, the following cast and wrought alloys may be utilized. Cast alloys like 201 from the difficult to cast 200 series, or 355, 356, or 357 from the 300 series may be employed. Wrought alloys like 6061 from the weldable 6000 series or 7075 from the high-strength 7000 series may be utilized. Other alloys may also be employed as are well-known to those having ordinary skill in the art, such as the utilization of aluminum alloy 8009 in additive manufacturing applications. Conventional cast or wrought aluminum alloys may be modified and optimized for additive manufacturing. The rapid solidification rates at which these alloys are deposited, layer by layer, allow for the creation of unique microstructures using various additive elements that could not be realized using ordinary cast/wrought alloy techniques. For purposes of this disclosure, this newer class of aluminum alloys will be referred to as "non-conventional" aluminum alloys. An exemplary, a class of non-conventional alloys includes those known as "rapidly solidified powder aluminum alloys", such as 7090 and 7091.

Figure 4:
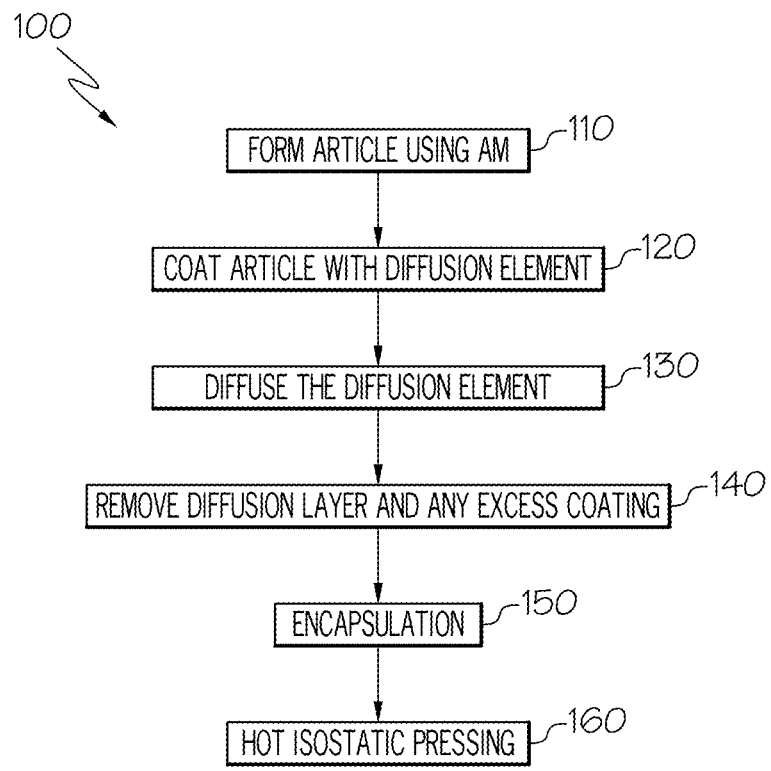
FIG. 4 is a flow diagram illustrating steps in a method for surface improvement of additively manufactured articles produced with aluminum alloys in accordance with an exemplary embodiment of the present disclosure.

FIG. 4 is a flow diagram illustrating steps in a method 100 for surface improvement of additively manufactured articles produced with aluminum alloys in accordance with an exemplary embodiment of the present disclosure. The method 100 includes a first step 110 of forming, using an additive manufacturing process, an article of manufacture having at least one surface. In some examples, the article of manufacture has both interior and exterior surfaces. Additive manufacturing processes can be used to produce complex geometries in a single operation with no tooling. Additive manufacturing technology allows for the article to be produced at a net-shape or near-net shape without the application of the heating, casting, or forging processes commonly used in the prior art. Thus, as used herein, the term additive manufacturing refers to any process wherein thin successive layers of material are laid down atop one another to form an article.

Figure 5:
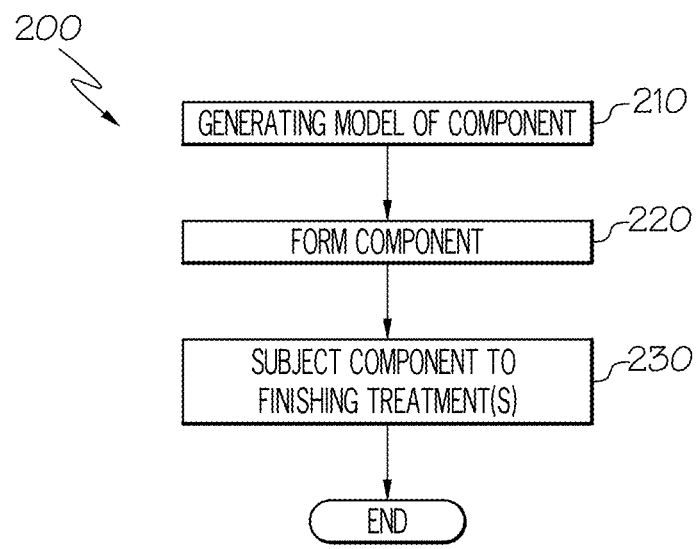
FIG. 5 is a flowchart illustrating a method for manufacturing the article using additive manufacturing techniques in accordance with an exemplary embodiment.

FIG. 5 is a flowchart illustrating a method 200 for manufacturing the article using additive manufacturing techniques. In a first step 210, a model, such as a design model, of the article may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component.

In step 220 of the method 200, the article is formed according to the model of step 210. In one exemplary embodiment, the entire component is formed using a rapid prototyping or additive layer manufacturing process. Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the article in step 220. DMLF is a commercially-available, laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the article. However, prior to a discussion of the subsequent method steps, reference is made to FIG. 6, which is a schematic view of a DMLF system 300 for manufacturing the article in accordance with an exemplary embodiment.

Figure 6:
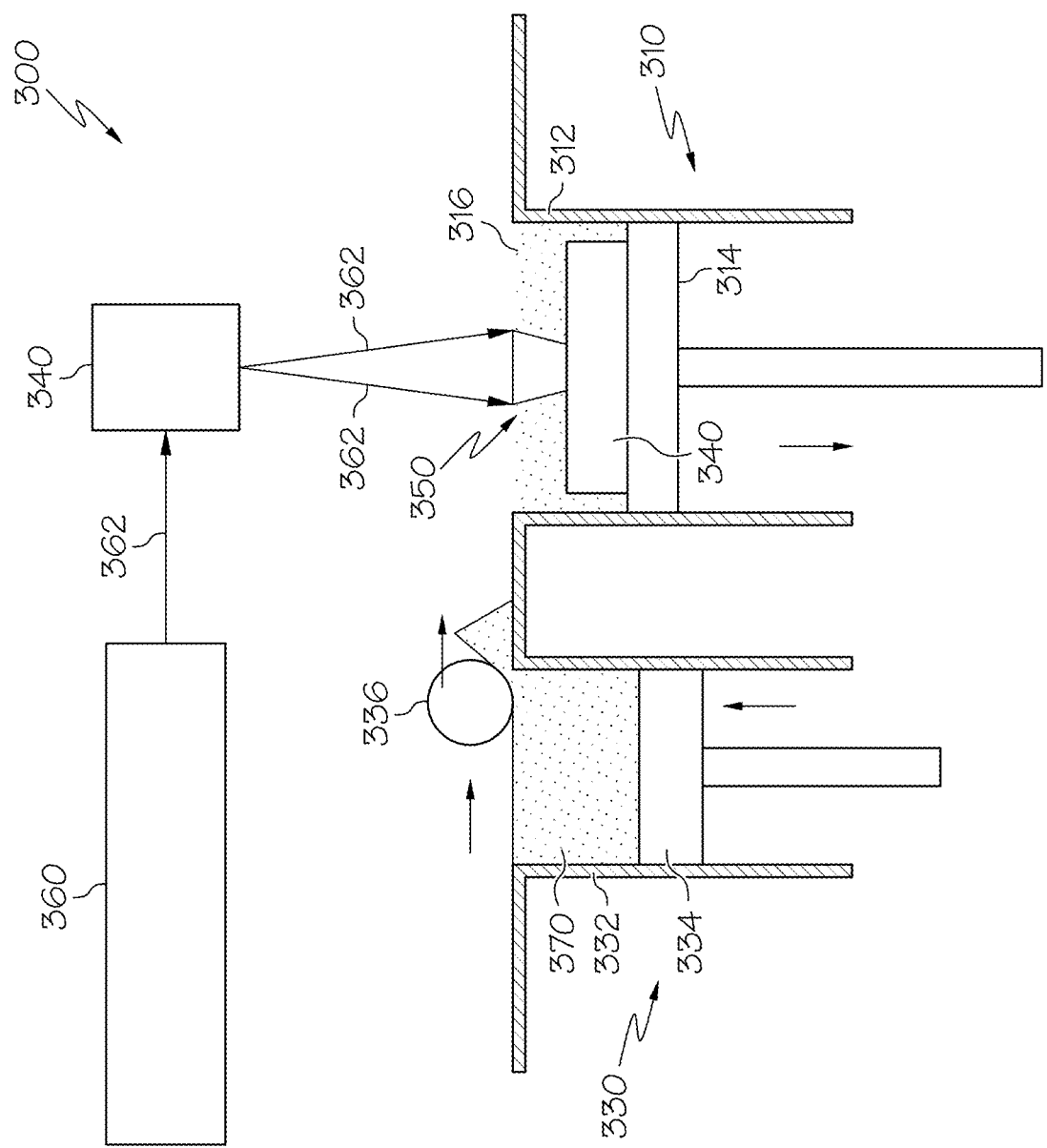
FIG. 6, which is a schematic view of an AM system for manufacturing the article in accordance with an exemplary embodiment.

Referring to FIG. 6, the system 300 includes a fabrication device 310, a powder delivery device 330, a scanner 340, and a laser 360 that function to manufacture the article 350 (e.g., the article) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 340 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. The build material 370 is provided as an aluminum alloy in powder form. As we noted initially above, non-limiting examples of such aluminum alloys include 201, 355, 356, 357, 6061, and 7075. In general, the powder build material 370 may be selected based on one or more of strength, durability, and useful life, particularly at high temperatures, although it should be appreciated that the powder build material 370 may also be selected based on the intended function of the article being formed. The powdered form of the alloy is produced by combining the various constituents (metals and other elements) of the alloy into a mixture, melting the mixture, and atomizing the melted mixture to form a powder, a process which is well-known in the art.

Returning to FIG. 5, at the completion of step 220, the article may be given a stress relief treatment, and then is removed from the additive manufacturing system (e.g., from the DMLF system 300). In optional step 230, the component formed in step 220 may undergo finishing treatments. Finishing treatments may include, for example, polishing, peening, and/or the application of coatings. If necessary, the component may be machined to final specifications. The article, produced using additive manufacturing techniques, has a layer-by-layer fused microstructure that exhibits anisotropic mechanical and physical properties. It should be noted that these "finishing treatments" of optional step 230, if present, are performed separately from and in addition to the plating, diffusing, stripping, and HIP procedures as are described in greater detail below in connection with the surface improvement processes of the present disclosure.

Figure 1:
FIG. 1 is an image of an article of manufacture made with additive manufacturing techniques, which exhibits surface roughness that would render it unsuitable for subsequent HIP processing.
Figure 1:
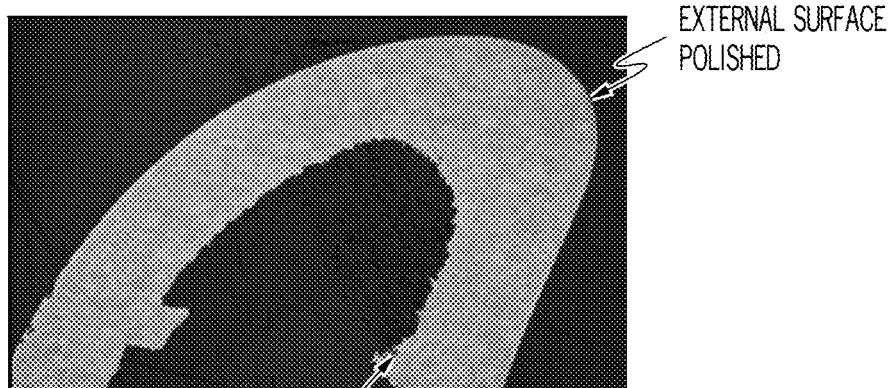
Figure 1:
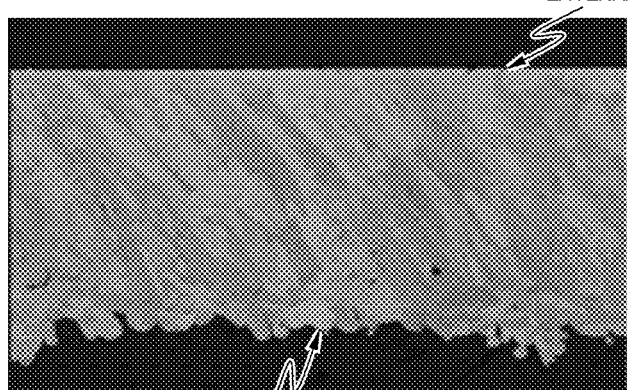
Figure 2:
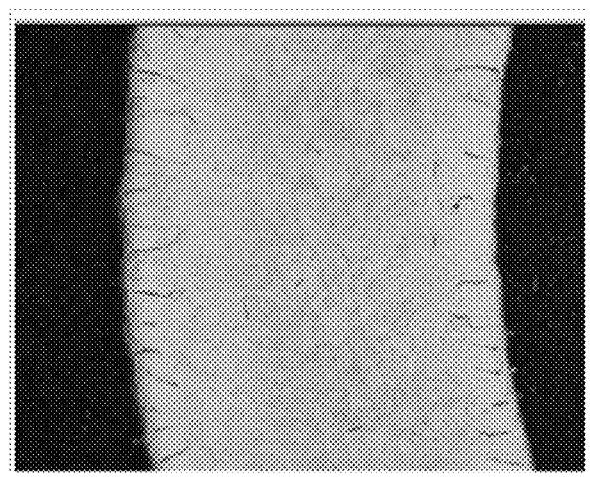
FIG. 2 is an image of an article of manufacture made with additive manufacturing techniques, which exhibits surface connected defects and internal defects that can be improved via encapsulation and HIP processing.
Figure 3:
FIG. 3 is an image of an article of manufacture made with additive manufacturing techniques, which exhibits an external surface that has been smoothed via electro-chemical means, yet which still exhibits an internal surface having roughness that would render it unsuitable for subsequent HIP processing.
Figure 7:
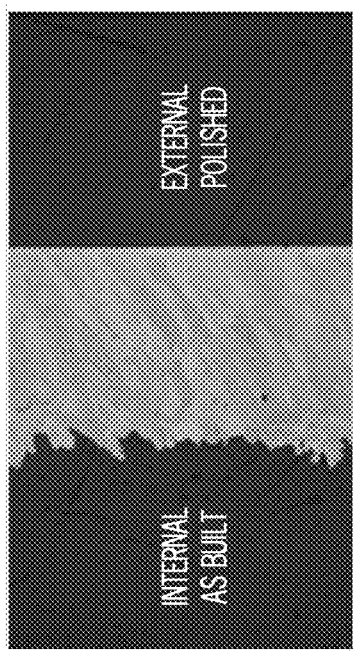
FIG. 7 illustrates an article of manufacture having its surfaces smoothed using techniques in accordance with embodiments of the present disclosure.
Figure 7:
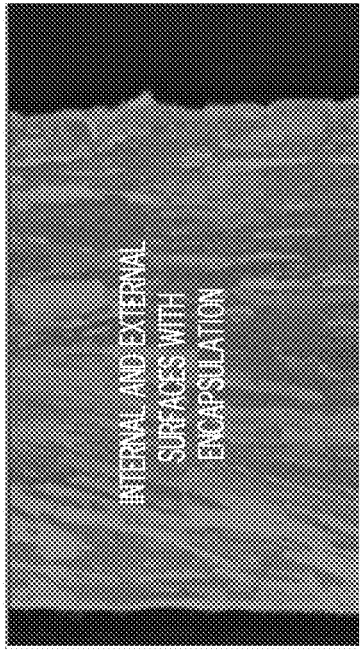
Figure 7:
Figure 7:
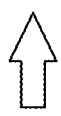
Figure 7:
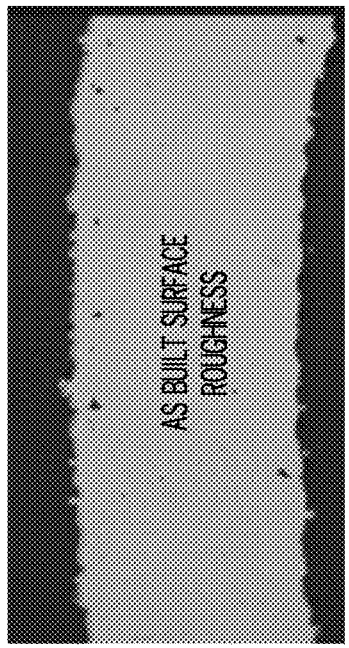
Figure 7:

Returning to FIG. 4, after the article 350 has been formed with the aluminum alloy using the additive manufacturing process as described above with regard to step 110 of method 100, it should be expected that the article 350 will exhibit surface roughness, as illustrated in detail in FIGS. 1-3. This roughness would prevent the use and/or successful application of beneficial HIP processing techniques to improve the article 350. Thus, in accordance with embodiments of the present disclosure method 100 continues with the diffusion of an element (or elements) into the surface of the AM aluminum article, followed by selectively removing the diffusion layer without detrimental attack of the aluminum substrate. In the course of doing so, the rough surface of article 350 is rendered smoother as has been demonstrated in FIG. 7, which is prophetic. This described operation can be performed repeatedly at appropriate steps in the overall manufacturing sequence, and the diffusion cycle can be sequenced with the component heat treatment cycle.

Thus, FIG. 4 illustrates a step 120, performed after step 110, where a diffusion element is coated onto the aluminum alloy article of manufacture, namely onto its surfaces, including both internal and external surfaces if present. One particular embodiment uses zinc as the diffusion element and plating as the coating process, and starts with a conventional zincate plating process for aluminum alloys, widely used as starting point or bond coat for various other plating processes. In the prior art, such coatings are done after all heat treating is completed. For example, the zincate plating process refers to the alkaline solutions used in a dipping (immersion) process to plate aluminum with zinc. This immersion process is electroless (i.e., not electroplating) and involves the displacement of zinc from zincate by aluminum:

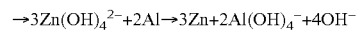
$$\rightarrow 3Zn(OH)_4{}^{2-}+2Al\rightarrow 3Zn+2Al(OH)_4{}^-+4OH^-$$

Alternatively, tin, silver, gold, copper, nickel or other elements may be electroless coated or electro-plated onto the aluminum alloy instead of zinc; a combination of several different elements or platings may be advantageous depending on the specific application and embodiment. The coating material is ideally metallic and capable of subsequent diffusion into the article 350 to form a diffusion coating. Moreover, plating or electroless plating should not be considered the only suitable coating technique. Rather, other coating processes such as spray-based processes, deposition-based processes, non-aqueous plating, molten salt baths, pack plating, and others may be used as well. The diffusion element may be applied to an internal surface of the article 350 to ensure that the coating material layer spans the surface-connected porosity and any cracks within. Some coatings may be more advantageous for their ability to encapsulate by forming a more continuous layer better suited for subsequent HIP (to improve the internal structure), and not necessarily form a diffusion layer. A particular purpose of diffusion coating is to enable subsequent removal to enhance the surface smoothness and metallurgy. While possible that one coating will do both, that is not necessary with proper sequencing. In some situations, it may be advantageous to perform diffusion coating and removal to improve exterior surfaces followed by encapsulation and HIP to improve both interior and exterior surfaces. Instead of removing an encapsulating coating of gold, nickel, etc., leaving such coatings in place may be beneficial to corrosion resistance, etc.

Once the article 350 has been coated with the diffusion element, method 100 continues with a step 130 of heat treating the article 350 and the coating material layer to diffuse the diffusion element and to form the diffusion coating on the article 350. The diffusion coating comprises a surface additive layer and a diffusion zone or layer below the surface additive layer. The surface additive layer is the coating material layer depleted in one or more elements after diffusing into the parent metal of the material substrate.

Diffusion heat treating may be performed at elevated temperatures of between about 350° C. to about 475° C. (662-887° F.) for about two hours to about twenty hours. Slow ramping through the melting point of the coating element or eutectics formed during diffusion may be desirable to overcome objectionable melting of this "sacrificial in-process layer". In other embodiments, the diffusion heat treatment may occur at a temperature and/or for a time period (duration) outside of the aforementioned ranges. After diffusion heat treating, the article 350 may be cooled.

During the coating step 120, if performed at a sufficiently elevated temperature, a primary diffusion zone occurs to some degree between the coating material layer and the substrate as a result of the concentration gradients of the constituents. At elevated temperatures of the diffusion heat treating step 130, further inter-diffusion occurs as a result of solid-state diffusion across a coating bond line. The coating bond line is the demarcation between the applied coating material layer and the substrate. The coating bond line is the "edge" of the article 350.

A thickness of the diffusion layer of about 0.2 to about 3 mils is optimal, and corresponds to how much of the upper portion of the substrate of the first intermediate article will be removed in subsequently described steps. Diffusion time and temperature may be controlled to achieve the desired thickness. If significant surface roughness and surface-connected defects exist, a thicker diffusion coating may be necessary. Internal passage surface diffusion layers may be thinner than diffusion layers on external surfaces and steps can be taken to selectively reduce the thickness of the diffusion layer on the external surfaces to arrive at a more even diffusion coating overall to better hold dimensions following removal of the diffusion coating, as hereinafter described. To reach internal or hollow portions of the article, the diffusion element (for example, zincate solution) may be flowed through the article. To reach "dead-end" passages, vacuum impregnation may be employed.

Still referring to FIG. 4, according to exemplary embodiments, method 100 continues with a step 140 of removing the diffusion coating (also referred to herein as "stripping") to improve the surface of the article 350. The layers of the diffusion coating are substantially removed in their entirety to the coating diffusion boundary thereby forming the improved surface. As the diffusion layer includes the upper portion of the substrate, the upper portion of the substrate will also be removed. The diffusion coating and removal steps function to reduce surface roughness, resulting in the article 350 having enhanced surfaces. The coating diffusion boundary should be sufficiently defined or sharp such that removal of the diffusion coating yields a substrate surface composition close to that of the original substrate.

The diffusion coating may be removed by any known diffusion coating removal technique, including mechanical, chemical, electro-chemical, or any suitable combination thereof. For example, the cooled component may be flushed inside and out in a chemical solvent such as ferric chloride, nitric acid, etc. The chemical solvent is selected for its ability to remove the diffusion coating, without affecting the integrity of the aluminum alloy article 350. The coating removal chemical compositions and concentrations may be modified to optimize the amount of diffusion coating removed and/or the removal time while maintaining the integrity of the substrate. The dimensions of the original model for the component may be modified to accommodate removal of the upper portion of the original substrate above the coating diffusion boundary to allow the finished component to meet finished component dimensions. The stripping process can be dependent on the particular aluminum alloy, and electrochemical stripping may be used. In another embodiment for stripping, the diffusion layer is removed by forming an anodic aluminum oxide (anodize) coating on the diffusion layer and then removing the combined diffusion/anodize coating chemically.

If, after performing steps 120-140, there is residual surface roughness or surfaces with inadequate diffusion bonded faying surfaces ("diffusion bonding failures"), forming of the diffusion coating (applying and diffusion heat treating steps) and removal thereof (hereinafter collectively a "forming and removing cycle") may optionally be repeated as many times as necessary until the at least one surface of the article is sufficiently enhanced, the sufficiency thereof known to one skilled in the art. As noted above, the term "enhanced" or the like refers to a reduction in surface roughness and/or improvement in metallurgical quality. The improvement in metallurgical quality results from removing surfaces lacking sufficient metallurgical surface integrity caused by inadequately metallurgically diffusion bonded faying surfaces of the surface-connected cracks.

After the one or more forming and removing cycles are performed, the method 100 may continue with an encapsulation step 150. An encapsulation layer functions to effectively convert the surface porosity and cracks into internal porosity and cracks. Any suitable encapsulation process may be performed that bridges and covers the porosity and cracks in at least one surface of the article. For example, the encapsulation layer may have a thickness of approximately 10-100 μm, although any suitable thickness may be provided. Such encapsulation layer may be subsequently removed or maintained to function as an oxidation protection layer. The encapsulation layer may be a metal or alloy that is compatible with the substrate material and may be formed, for example, by a plating process or a coating process. In various exemplary embodiments, the encapsulation layer may be formed for example, by electroless plating or electroplating processes. In further embodiments, the encapsulation layer may be formed by processes including cobalt plating, sol-gel chemical deposition techniques, or low pressure plasma sprays. A suitable material for the encapsulation layer is one which when applied or when heated to the HIP temperature is relatively ductile and free of gaps or cracks and which spans the surface-connected porosity and cracks within, for example, internal passages of the aluminum alloy article 350.

After encapsulation, the method 100 may continue with a HIP processing step 160. In the hot isostatic pressing (HIP) process, the article 350 is subjected to elevated temperatures and pressures over time. HIP processing reduces or substantially eliminates internal void defects, such as porosity or cracks. The HIP process may be performed at any temperature, pressure, and time that are suitable for diffusion bonding and forming a compacted solid having minor or acceptable levels of porosity, but substantially free of cracks. For example, the HIP process may be performed at a processing temperature in a range of about 480° C. to about 530° C. and may be performed at a pressure in a range of about 1 ksi to about 25 ksi for a time period of about 1 to about 10 hours. In other embodiments, the HIP processing temperature, pressure, and time may be higher or lower to form a compacted article having negligible cracks and porosity. The consolidated article 350 may comprise the finished component.

Accordingly, the disclosed are methods for surface improvement of additively manufactured articles produced with aluminum alloys. The methods diffuse an element into the surface of the aluminum alloy article, and then strip the diffusion layer to create an enhanced surface.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for improving a surface of an aluminum alloy article comprising:
   manufacturing the aluminum alloy article using an additive manufacturing technique, wherein the article as-manufactured comprises one or more of cracks, roughness, or porosity at a surface of the article;
   coating the surface of the aluminum alloy article with an encapsulating element, which may or may not also be a diffusion element, to facilitate HIP response;
   coating the surface of the aluminum alloy article with a diffusion element, the diffusion element being capable of diffusing at least 0.2 mils into the article, wherein the diffusion element is selected from the group consisting of: silver, gold, copper, and nickel;
   heating the aluminum alloy article coated with the diffusion element to cause the diffusion element to diffuse the at least 0.2 mils into the article, thereby forming a diffusion layer of at least 0.2 mils in thickness comprising both aluminum alloy and diffusion element; and
   removing the diffusion layer from the aluminum alloy article, whereby upon the removing, a resulting improved surface of the article comprises fewer or smaller cracks, reduced roughness, or reduced porosity.

2. The method of claim 1, wherein the aluminum alloy article comprises an aluminum alloy selected from the group consisting of: cast alloys and wrought alloys.

3. The method of claim 1, wherein the additive manufacturing technique is selected from the group consisting of: direct metal laser sintering, direct metal laser fusion, electron beam melting, and selective laser sintering.

4. The method of claim 1, wherein coating the surface comprises an electroless plating process or wherein coating the surface comprises an electrolytic plating process.

5. The method of claim 1, wherein the diffusion element diffuses at least 1 mil into the article.

6. The method of claim 1, further comprising repeating the steps of coating, heating, and removing an additional one or more times.

7. The method of claim 6, wherein coating with the encapsulating occurs after the removing step.

8. The method of claim 1, further comprising hot isostatic pressing the article.

9. The method of claim 1, wherein hot isostatic pressing occurs after the removing step.

10. The method of claim 1, wherein the aluminum alloy article is a component of a gas turbine engine.

11. A method for reducing roughness, porosity, and cracking of a surface of an aluminum alloy article comprising:
    manufacturing the aluminum alloy article using an additive manufacturing technique, wherein the article as-manufactured comprises one or more of cracks, roughness, or porosity at a surface of the article;
    coating the surface of the aluminum alloy article with an encapsulating element, which may or may not also be a diffusion element, to facilitate HIP response;
    coating the surface of the aluminum alloy article with a diffusion element, wherein the diffusion element is selected from the group consisting of: silver, gold, copper, and nickel, the diffusion element being capable of diffusing at least 0.2 mils into the article;
    heating the aluminum alloy article coated with the diffusion element at a temperature between 350° C. to 475° C. for a time period of 2 to 20 hours to cause the diffusion element to diffuse the at least 0.2 mils into the article, thereby forming a diffusion layer of at least 0.2 mils in thickness comprising both aluminum alloy and diffusion element; and
    removing the diffusion layer from the aluminum alloy article using a chemical solvent of ferric chloride or nitric acid, whereby upon the removing, a resulting improved surface of the article comprises fewer or smaller cracks, reduced roughness, or reduced porosity, wherein coating with the encapsulating element occurs after the removing step.

12. The method of claim 11, wherein the aluminum alloy composition comprises a majority aluminum on a weight basis, and wherein the aluminum alloy article comprises an aluminum alloy selected from the group consisting of: cast alloys, wrought alloys, derivatives of said cast or wrought alloys.

13. The method of claim 11, wherein the additive manufacturing technique is selected from the group consisting of: direct metal laser sintering, direct metal laser fusion, electron beam melting, and selective laser sintering.

14. The method of claim 11, wherein the diffusion element diffuses at least 1 mil the article.

15. The method of claim 11, further comprising repeating the steps of coating, heating, and removing an additional one or more times.

16. The method of claim 11, further comprising hot isostatic pressing the article.

17. The method of claim 11, wherein hot isostatic pressing occurs after the removing step.

18. The method of claim 11, wherein the aluminum alloy article is a component of a gas turbine engine.

19. A method for reducing roughness, porosity, and cracking of a surface of an aluminum alloy article comprising:

manufacturing the aluminum alloy article using an additive manufacturing technique, wherein the article as-manufactured comprises one or more of cracks, roughness, or porosity at a surface of the article;

coating the surface of the aluminum alloy article with an encapsulating element, which may or may not also be a diffusion element, to facilitate HIP response;

coating the surface of the aluminum alloy article with a diffusion element, wherein the diffusion element is selected from the group consisting of: silver, gold, copper, and nickel;

heating the aluminum alloy article coated with the diffusion element to cause the diffusion element to diffuse into the article, thereby forming a diffusion layer comprising both aluminum alloy and diffusion element; and removing the diffusion layer from the aluminum alloy article using a chemical solvent of ferric chloride or nitric acid, whereby upon the removing, a resulting improved surface of the article comprises fewer or smaller cracks, reduced roughness, or reduced porosity, wherein coating with the encapsulating element occurs after the removing step.

20. The method of claim 19, wherein the aluminum alloy article is a component of a gas turbine engine.

\* \* \* \* \*